(12) United States Patent
Mukherjee et al.

(10) Patent No.: US 7,664,799 B2
(45) Date of Patent: Feb. 16, 2010

(54) IN-MEMORY SPACE MANAGEMENT FOR DATABASE SYSTEMS

(75) Inventors: Niloy Mukherjee, Belmont, CA (US);
Amit Ganesh, San Jose, CA (US);
Sujatha Muthulingam, Sunnyvale, CA (US); Wei Zhang, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 310 days.

(21) Appl. No.: 11/830,568

(22) Filed: Jul. 30, 2007

(65) Prior Publication Data
US 2009/0037498 A1   Feb. 5, 2009

(51) Int. Cl.
*G06F 17/30* (2006.01)
(52) U.S. Cl. ..................................... 707/205
(58) Field of Classification Search ................ 707/204, 707/205; 709/212–216; 714/763; 711/100, 711/170–173
See application file for complete search history.

(56) References Cited

U.S. PATENT DOCUMENTS

| | | | |
|---|---|---|---|
| 5,025,367 A * | 6/1991 | Gurd et al. ................. | 707/206 |
| 5,555,405 A | 9/1996 | Griesmer et al. | |
| 5,652,613 A * | 7/1997 | Lazarus et al. ................. | 725/50 |
| 6,073,129 A | 6/2000 | Levine et al. | |
| 6,185,663 B1 | 2/2001 | Burke | |
| 6,247,109 B1 | 6/2001 | Kleinsorge et al. | |
| 6,298,425 B1 | 10/2001 | Whitaker et al. | |
| 6,324,535 B1 | 11/2001 | Bair et al. | |
| 6,769,124 B1 | 7/2004 | Schoening et al. | |
| 6,873,995 B2 | 3/2005 | Benson et al. | |
| 6,947,959 B1 | 9/2005 | Gill | |
| 2003/0154216 A1 | 8/2003 | Arnold et al. ............ | 707/104.1 |

OTHER PUBLICATIONS

Cyran, Michele, et al., "Oracle® Database Concepts", Oracle, 10g Release 2 (10.2), dated Oct. 2005, 11 pages.

* cited by examiner

*Primary Examiner*—Cheryl Lewis
(74) *Attorney, Agent, or Firm*—Hickman Palermo Truong & Becker LLP (57) ABSTRACT

A framework for in-memory space management for content management database systems is provided. A per-instance in-memory dispenser is partitioned. An incoming transaction takes a latch on a partition and obtains sufficient block usage to perform and complete the transaction. Generating redo information is decoupled from transaction level processing and, instead, is performed when block requests are loaded into the in-memory dispenser or synced therefrom to a per-instance on-disk structure.

38 Claims, 7 Drawing Sheets

IN-MEMORY SPACE MANAGEMENT FOR DATABASE SYSTEMS

FIELD OF THE INVENTION

The present invention relates to database systems and, more particularly, to a framework for in-memory space management for content management database systems.

BACKGROUND OF THE INVENTION

Typically, in any system that stores data, there is a mechanism for keeping track of what portions of storage are currently available to store new data, and what portions of available storage are not. The portion of available storage that is currently available for storing new data is generally referred to as "free space". Within a database system, the processes responsible for keeping track of the free space are collectively referred to as the "space management layer".

The smallest unit of space that can be independently allocated for use is referred to herein as a "data block" (or simply "block"). In some systems, the size of the data block is 8 kilobytes. For ease of discussion herein and for illustrative purposes only, it shall be assumed that each data block is 8 kilobytes. Because each data block has size 8 k, then it follows logically, and for illustrative purposes only, that the minimum input/output (I/O) size or unit is one 8 k block, or whatever is the minimum block size.

Information about whether a data block on disk is currently available ("free") or not currently available ("used") is maintained in a metadata structure. In one system, such metadata structures take the form of "shared-block-usage maps", each of which resides on an 8K disk block. Table A hereinbelow shows an example in schematic form of the relevant informational data in one shared-block-usage map. The shared-block-usage map in Table A has a column that stores data block addresses and a corresponding column showing the status of the block, whether the block is currently free or used.

TABLE A

| DATA BLOCK ADDRESS (dba) | STATUS |
| --- | --- |
| dba-1 | used |
| dba-2 | used |
| ... | ... |
| dba-128 | used |
| dba-129 | free |
| ... | ... |

It should be appreciated that the shared-block-usage map is read from disk every time a transaction, from any user of the corresponding database, requests block usage for any of the blocks represented in the shared-block-usage map. Reading the shared-block-usage map from disk results in a logical I/O being performed. The logical I/O involves reading the 8K shared-block-usage map from disk into a buffer cache in volatile memory or, if a copy of the 8K shared-block-usage map is already in a buffer cache of a remote database server instance, from the remote buffer cache to a local buffer cache.

However, before the shared usage map is read from disk, an exclusive lock is placed on the shared-block-usage map so that no other process can access the shared-block-usage map and modify the data. The result is that the shared usage block can only be used by one process at a time. For example, assume that a transaction requests to insert a row in a table. Insertion of the row requires usage of a disk block. Therefore, a process at the space management layer receives a request for a disk block. In response to the request, the process obtains a lock on a shared-block-usage map, and then reads the shared-block-usage map from disk. The shared-block-usage map contains an entry that indicates that a particular block is current free. The free block is provided to the transaction to allow the transaction to perform the insert operation. A flag in the shared-block-usage map corresponding to the block is set to "used". The lock on the shared blocked usage map is released, thereby making the shared-block-usage map available for other space requests. Multiple transactions requesting to lock and search the same shared usage map must wait until the shared usage map is available.

In transaction-based systems, such as database management systems, operations that use storage or release storage are performed atomically with the corresponding updates to the free space information. For example, if a database transaction involves operations that use five blocks, then the update to the free space information to indicate that the five blocks are used is performed as part of the transaction. If the transaction fails, then the change to the free space information is rolled back so that the free space information will still show the five blocks to be free. Also, such systems durably store the free space information so that system can continue to work properly after crashes that cause the loss of information stored in volatile memory.

In the context of shared-block-usage maps, durability is achieved by generating redo information every time a shared-block-usage map is updated in volatile memory. Specifically, each block request involves obtaining a lock on a shared-block-usage map, changing the shared-block-usage map, generating redo for the change, and then releasing the lock. The lock on the shared-block-usage map is released as soon as possible, rather than when the transaction that is making the change commits, to allow greater concurrency within the system. Otherwise, the free blocks represented in the shared-block-usage map would not be available to any other transactions until the transaction committed.

When a transaction commits, the redo generated for changes made to shared-block-usage maps by that transaction are flushed to disk. Consequently, even if the contents are volatile memory are lost after a transaction is committed, the disk blocks used by the transaction will continue to be treated as "used".

As explained above, each request for free space that is made during a transaction results in generation of redo information. Further, even if a transaction requires one megabyte of space, the transaction requests space one 8 k block at a time to support concurrency among multiple instances that have access to the same database resources or objects, such as tables, indexes and the like. Thus, a transaction requesting to store one megabyte of data may issue 128 block usage requests (for 128 8K blocks). The 128 block usage requests would result in 128 changes to shared-block-usage maps, which in turn would cause the generation of 128 redo records. When the transaction commits, the 128 redo records are flushed to disk, along with any other redo generated by the transaction.

The amount of overhead that results from generating undo for each disk block that transitions from free-to-used, or from used-to-free, increases in proportion to the amount of space used or freed by transactions. In the example given above, the storage of one megabyte results in the generation of 128 redo records. However, real life examples of large files include video, x-ray pictures, and high dimensional content, which may exceed 100 megabytes.

Figure 1:
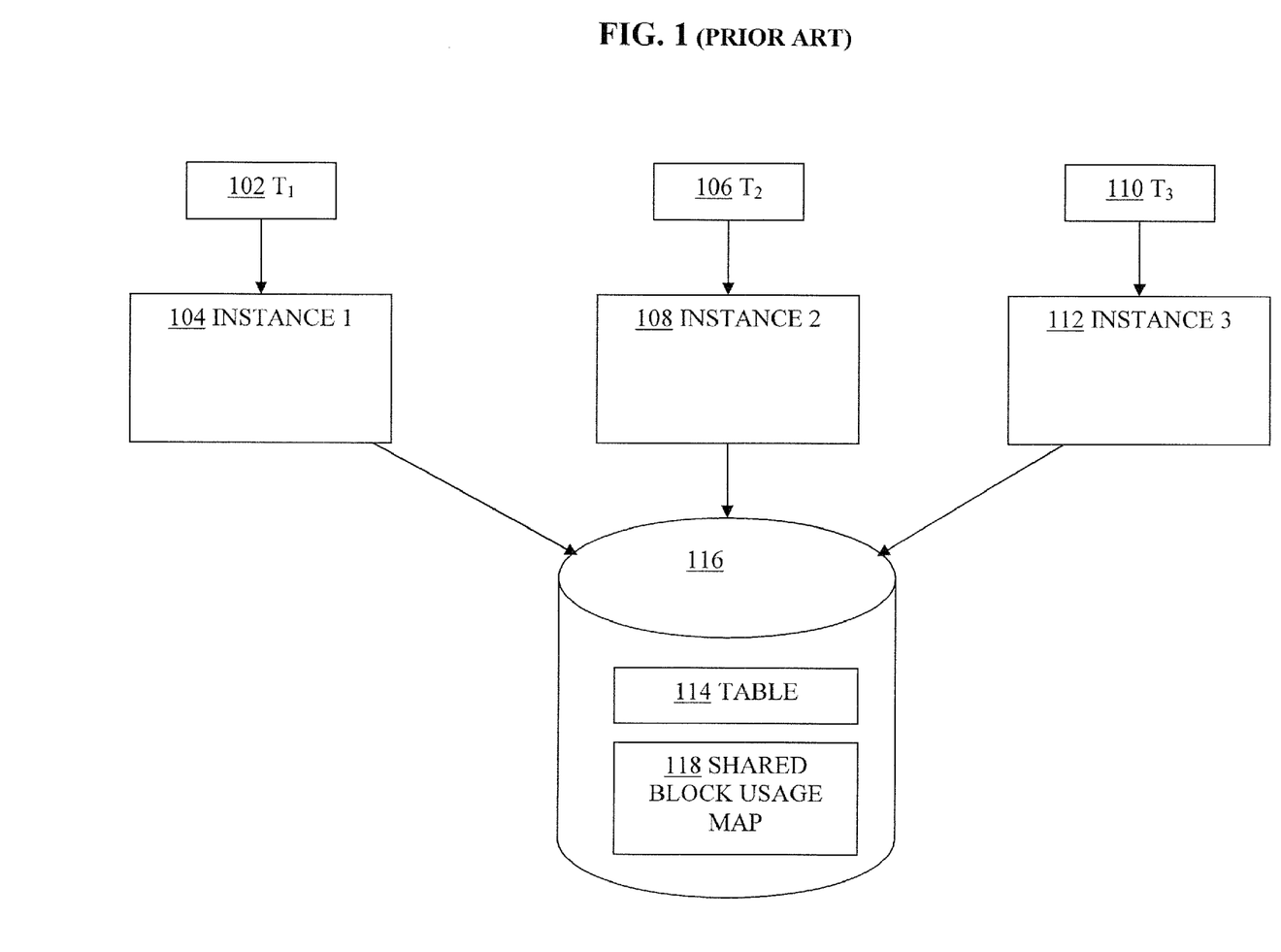
FIG. 1 is a schematic diagram showing how free space is managed with respect to incoming transactions for three database server instances and a shared database that contains a shared-block-usage map according to the prior art.

An example showing three transaction requests executed in three database server instances, where each database server instance is has access a shared-block-usage map, can be described with reference to FIG. 1. Referring to FIG. 1, a first transaction 102 is executed by the first instance 104, a second transaction 106 is executed by the second instance 108, and a third transaction 110 is executed by the third instance 112. Suppose, in this example, that each of transactions 102, 104, and 106 requests to add rows to the same table 114 of a database 116. To add the rows, each of instances 104, 108, and 112, must read and update shared-block-usage map 118.

For example, transaction 102 requests to add a row to table 114. Instance 104 requests an exclusive lock on shared-block-usage map 118, searches for a data block that is free, performs transaction 102, updates the shared-block-usage map 118 to indicate that the data block as used, generates redo for the update, and unlocks shared-block-usage map 118. Further, instance 104 generates redo information after updating shared-block-usage map to indicate that the data block is used.

While instance 104 has an exclusive lock on shared-block-usage map 118, instances 108 and 112 cannot perform their respective transactions 106 and 110 because instance 108 and instance 112 cannot access to shared-block-usage map 118 to search for free space. One way of supporting concurrency is by ensuring frequent accessibility to the shared-block-usage map. In this example, the transaction, through the instance, obtains a lock on shared-block-usage map 118, writes one block worth of data, updates the shared-block-usage map to indicate that the block is used, generates redo information, and then releases the lock on shared-block-usage map 118. The cycle repeats itself for each of the other two transactions 106 and 110. For writing the second block of data from the one megabyte, the transaction obtains a second lock on shared-block-usage map 118, writes the second block worth of data of a second free block, marks the second free block as used, a second redo operation is performed, and then the transaction lets go of the lock, and so on.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Multi-Tier Level Free Space Management

According to one embodiment, multiple levels of structures are used to manage free space within a multiple-instance system. Specifically, in one embodiment, free space is managed using structures at the global level, a per-instance persistent level, and a per-instance volatile level. Such an embodiment is illustrated in FIG. 2.

Figure 2:
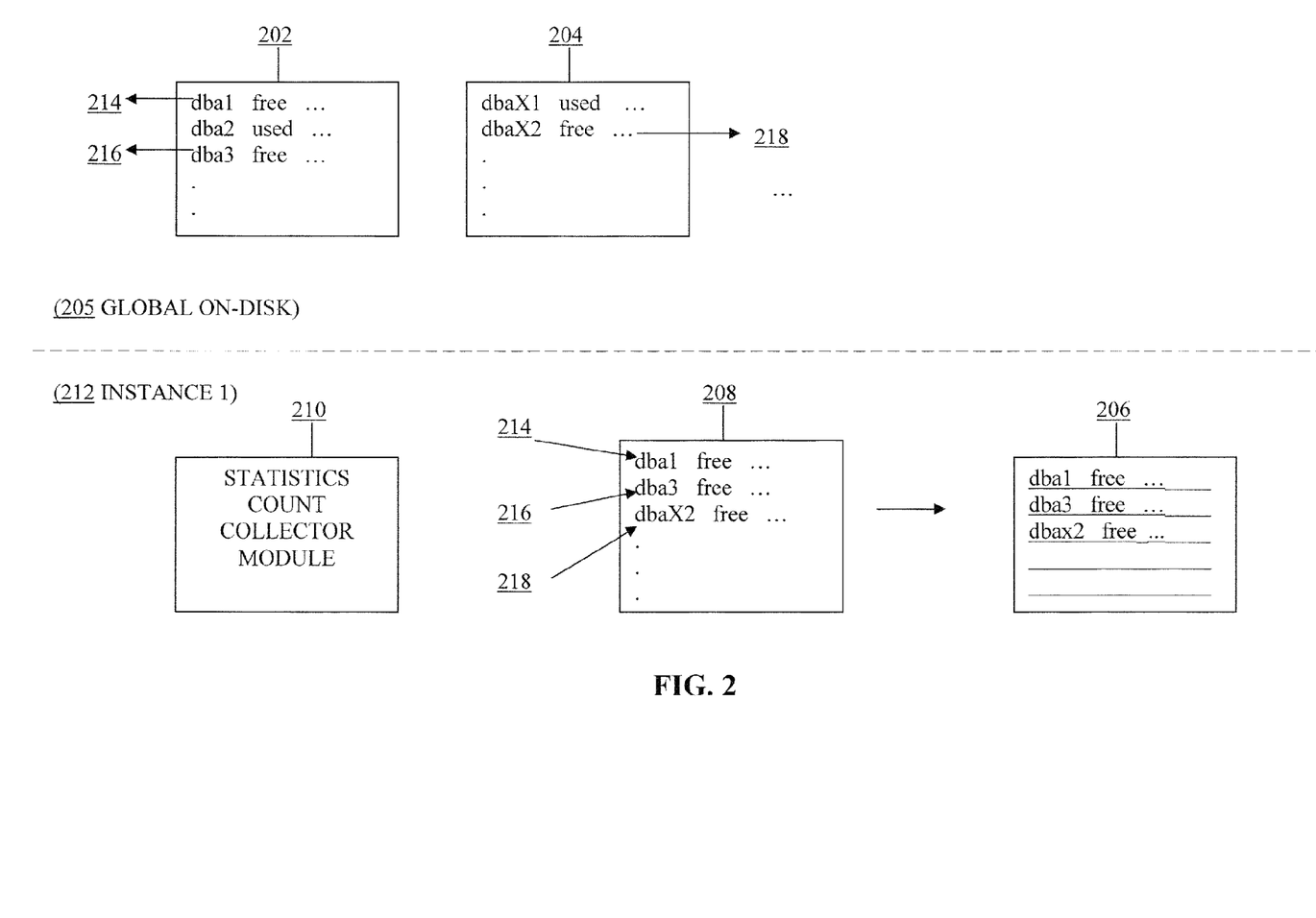
FIG. 2 is a schematic diagram of an embodiment showing at least two share block usage maps, which are each global structures on-disk or in buffer cache of a global storage system.

Referring to FIG. 2 is a schematic diagram showing two shared-block-usage maps (202 and 204). Shared-block-usage maps 202 and 204 are "global" in that they are accessible to and used by a plurality of instances to keep track of free space within a multiple-instance system. Thus, FIG. 2 illustrates that shared-block-usage maps 202 are "global on-disk" 205.

In addition to global shared-block-usage maps, the techniques described herein make use of persistent area structures ("PA structures"). Unlike shared-block-usage maps 202 and 204, every PA structure is not used by all database server instances. Instead, PA structures are instance-specific. For example, PA structure 208 illustrated in FIG. 2 is specific to instance 212. Other instances that have access to shared-block-usage maps 202 and 204 would have their own respective PA structures, and would not use PA structure 208.

Each PA structure is a persistently-stored "copy" of a corresponding shared-block-usage map. The instance associated with a PA structure may load information from the PA structure into its volatile memory, thereby creating an in-memory structure that corresponds to the PA structure. In FIG. 2, in-memory structure 206 is a copy of PA structure 208, stored in the volatile memory of instance 212.

According to one embodiment, each in-memory structure is partitioned based on the level of concurrency within the instance in which the in-memory structure resides. For example, assume that the computer in which instance 212 resides has had ten processors working concurrently for the last ten minutes, in-memory structure 206 may be partitioned into ten partitions, each of which is subject to a distinct lock. Because each partition is subject to a distinct latch, the number of partitions dictates the number of processes that can concurrently access information within the in-memory structure 206.

Significantly, the partitions of the in-memory structure are not subject to the size constraints of disk blocks. For example, in a system where disk blocks are 8K, an 8K in memory-structure may be broken up eight 1K partitions. Thus, the granularity of the latches on the partitions of in-memory structure 206 can be much finer than the locks on PA structures (e.g. PA structure 208) or shared-block-usage maps (e.g. maps 202 and 204). Consequently, holding a lock on a partition of in-memory structure 206 does not have as great an adverse effect on concurrency than holding locks on a shared-block-usage map.

In one embodiment, a process that desires space obtains space by (1) being hashed to one of the partitions of the in-memory structure of the instance in which the process resides, (2) obtaining a latch on that partition, (3) making a change to the data within the partition to reflect that a block is freed and/or used, and (4) releasing the latch on the partition. According to one embodiment, the change made to the partition of the in-memory structure is performed without generating any redo. Consequently, the amount of redo records generated by a transaction relating to storage allocation is no longer equal to the number of disk blocks that are freed or used by the transaction.

Anticipatory Space Requests

According to an embodiment, each database server instance makes anticipatory storage space requests based on estimates of how much space the instance (or processes within the instance) will require during an upcoming time period. For example, if instance 212 estimates that processes executing within instance 212 will need one megabyte of disk storage in the next ten minutes, then instance 212 issues a request for one megabyte of disk storage.

In one embodiment, such per-instance anticipatory requests are handled by (1) locating an available shared-block-usage map, (2) locking the disk block containing the map, (3) updating the block to reflect that certain blocks are being changed from "free" to "used", (4) generating redo for the change, and (5) releasing the lock on the map. Thus, the manner in which anticipatory store space requests are handled may be the same as all types of storage requests were previously handled.

After a shared-block-usage map has been updated to reflect that blocks are used, no other instances will attempt to use those same blocks. Further, because redo is generated for the changes made to the shared-block-usage map, those blocks will continue to be treated as "used" even if a failure causes data in volatile memory to be lost.

Even though other instances consider the space allocated in an anticipatory storage request to be used, the instance that made the anticipatory storage request continues to treat the storage as "available". The instance may then allocate this available storage to local processes without having to perform further operations involving shared-block-usage maps. Only after the space obtained by an anticipatory storage space request has been fully used by local processes does an instance need to obtain further storage by modifying shared-block-usage maps.

Statistics Count Collector Per Instance

As mentioned above, each instance periodically generates anticipatory storage requests based on estimates of how much space the instances will need during a particular period. The estimates used to make periodic per-instance space requests may be based on statistics collected by per-instance statistics count collectors.

In one embodiment, each database instance has its own collector which collects information about the amount of space used by the instance during every interval, such as 10 minutes. A circular buffer may be used to store per-interval statistics for any particular number of intervals. For example, in a system that stores statistics based on 10 minute intervals, a six-slot circular buffer may be used to store statistics for the six most recent intervals, thereby covering the last 60 minutes. Based on these statistics, the instance may estimate the amount of storage that the instance will require during the period associated with the next anticipatory space request. For example, if the next anticipatory space request is a request for storage that will be used by the instance in the next 30 minutes, then the anticipatory storage request may request an amount of space that is half as much as was actually used by the instance in the last 60 minutes.

An embodiment of the statistics count collector can be described with reference to FIG. 2. Every instance maintains a statistics count collector 210. In an embodiment, the statistics count collector is in local memory to the instance. Statistics count collector 210 counts how many blocks were requested per the instance for the last predetermined amount of time, such as for the last ten minutes, for example. Statistic count collector 210 keeps the number of blocks requested for the last ten minutes, for example, for a predetermined number of intervals, such as six, for example. Put another way, for example, the statistic count collector has sixty minutes worth of data, which represents how many blocks were requested in the last sixty minutes, with ten minute intervals.

Using the information maintained by statistics count collector, each instance can predict or estimate the amount of blocks that are to be requested in the upcoming time interval, e.g. in the next 10 minutes.

Persistent Area Per Instance

Once an instance determines the amount of block usage needed for the next interval, based on the estimate from its statistics count collector, the instance performs an anticipatory storage request, as described above. As part of the anticipatory storage request, the instance populates a PA structure with entries from the shared-block-usage map that was used to obtained the desired storage. However, the entries in the PA structure will initially indicate that certain blocks are still free, even though those blocks have been marked as "used" within the corresponding shared-block-usage map.

For example, referring to FIG. 2, instance 1 212 obtains an exclusive lock on shared-block-usage map 202. Instance 1 212 searches shared-block-usage map 202 and discovers that the first entry has a flag set to free and makes a copy of the first entry 214 in PA structure 208. While maintaining the exclusive lock, instance 212 continues to search shared-block-usage map 202 and determines that the second entry has the flag set to used, and so ignores or by-passes the second entry. While still maintaining the exclusive lock, instance 212 continues to search shared-block-usage map 202 and determines that the third entry has the flag set to free and makes a copy of the third entry 216 in PA structure 208. In this example, instance 212 completes the search on shared-block-usage map 202 and releases the exclusive lock. In this example, instance 212 determines more blocks are needed. Instance 212 obtains an exclusive lock on a second shared-block-usage map 204, representing the status of more data blocks. Instance 212 searches shared-block-usage map 204 and determines that the second entry has the flag set to free. Instance 212 makes a copy of the second entry of shared-block-usage map 204 into PA structure 208. It should be appreciated that an instance can have more than one PA structure, as well. Instance 212 makes a copy of PA structure 208 into a local in-memory structure 206.

It should be appreciated that if, for any reason, one or more PA structures do not have the amount of space or blocks needed for a particular transaction, in one embodiment, the process falls back to the standard technique of taking a lock on the shared-block-usage map on a block by block basis as described hereinabove. Similarly, the process can fall back on any current space management procedure for securing space. In one embodiment, the size of each PA structure is 8 kilobytes.

In-Memory Structure

Because the in-memory structure 206 is a memory structure local to instance 212, instance 212 has the flexibility to manipulate in-memory structure 206 as desired. As explained above, in-memory structure may be partitioned proportionally to the number of processors being used by the instance. For example, in an embodiment, the in-memory structure is partitioned into as many parts as there are processors of instance 212. That is, there is a one-to-one correspondence from an instance processor to a partition in the in-memory structure or in-memory map. For example, if instance 212 has 10 processors working in the last 10 minutes, then in-memory structure 206 is divided into 10 partitions.

In an embodiment, each partition is guarded by an in-memory latch. Each process is hashed into one of the partitions. The process obtains an in-memory latch. The process searches and finds the block. The process marks the block as used, adds some information, and releases the latch. Such process of obtaining a latch, searching, flipping a switch, i.e. marking the block from free to used, and releasing the latch used many less instructions, primarily because these steps are performed in memory, than attaining the same result by obtaining locks on the global shared-block-usage maps on-disk or in buffer cache. Performing the space management process in local memory does not generate any redo information. As well, obtaining a latch on a partition in memory as opposed to obtaining a lock on the global shared-block-usage map uses fewer instructions. Put another way, using an in-memory latch mechanism is much "computationally lighter" than using a global shared-block-usage map locking mechanism.

It should be appreciated that many processes representing transactions can directly access the in-memory block concurrently. Exclusive latches lock each partition during space search so as to provide space allocation consistency. Multiple processes in a single instance hash to multiple partitions during allocations for parallel writes. In the example hereinabove, 10 processors can access in-memory structure 206 concurrently, each to perform a transaction.

Further, it should be appreciated that the expectation is that for the current time interval, the in-memory structure accommodates all requests for space or blocks. The in-memory structure serves all subsequent space allocation requests from the database instance until the in-memory structure becomes filled.

An Example Process Flow

Figure 3:
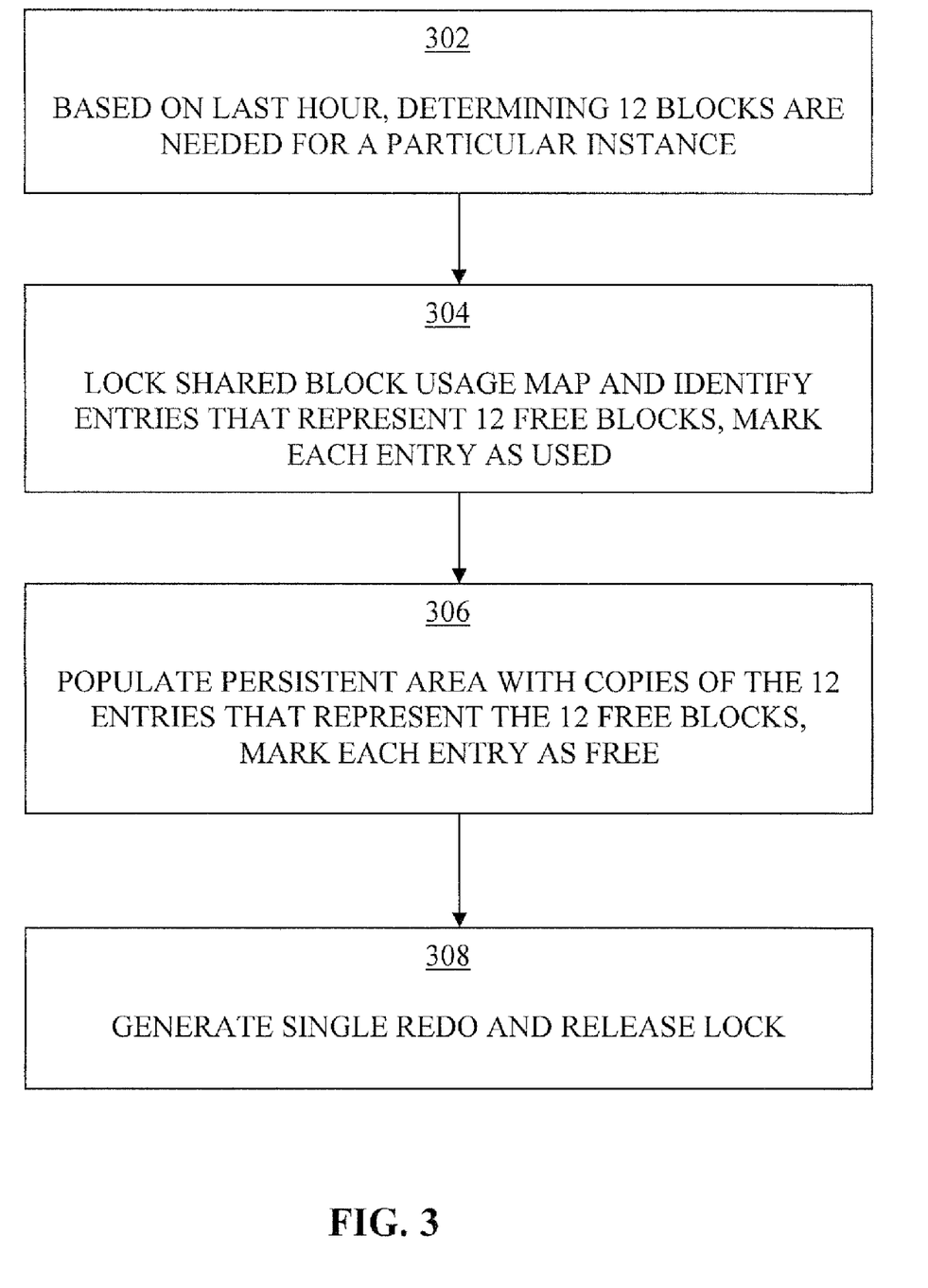
FIG. 3 is a process flow of an example of an embodiment of space management.

An example process flow can be described with respect to FIG. 3, a flow diagram of space management. In this example, and based on the in-memory statistics count collector, the instance knows 12 blocks of space (302) are needed. The instance locks the shared-block-usage map and identifies entries that represent 12 free blocks (304). If the locked shared-block-usage map cannot fulfill the request for 12 free blocks, then the instance moves on to the next shared-block-usage map on-disk or in buffer cache. As the entries are identified, the instance marks the entries in the shared-block-usage map as used and populates the PA structure with copies of the entries (306). The instance marks the entries in the PA structure as free. It should be appreciated that if needed, such as for example, if the space on the 8 k PA structure is full, the instance moves onto a second PA structure. In this example, the PA structure contains the entries representing the 12 blocks from the single shared-block-usage map. The instance then generates redo information and releases the lock (308).

Figure 4:
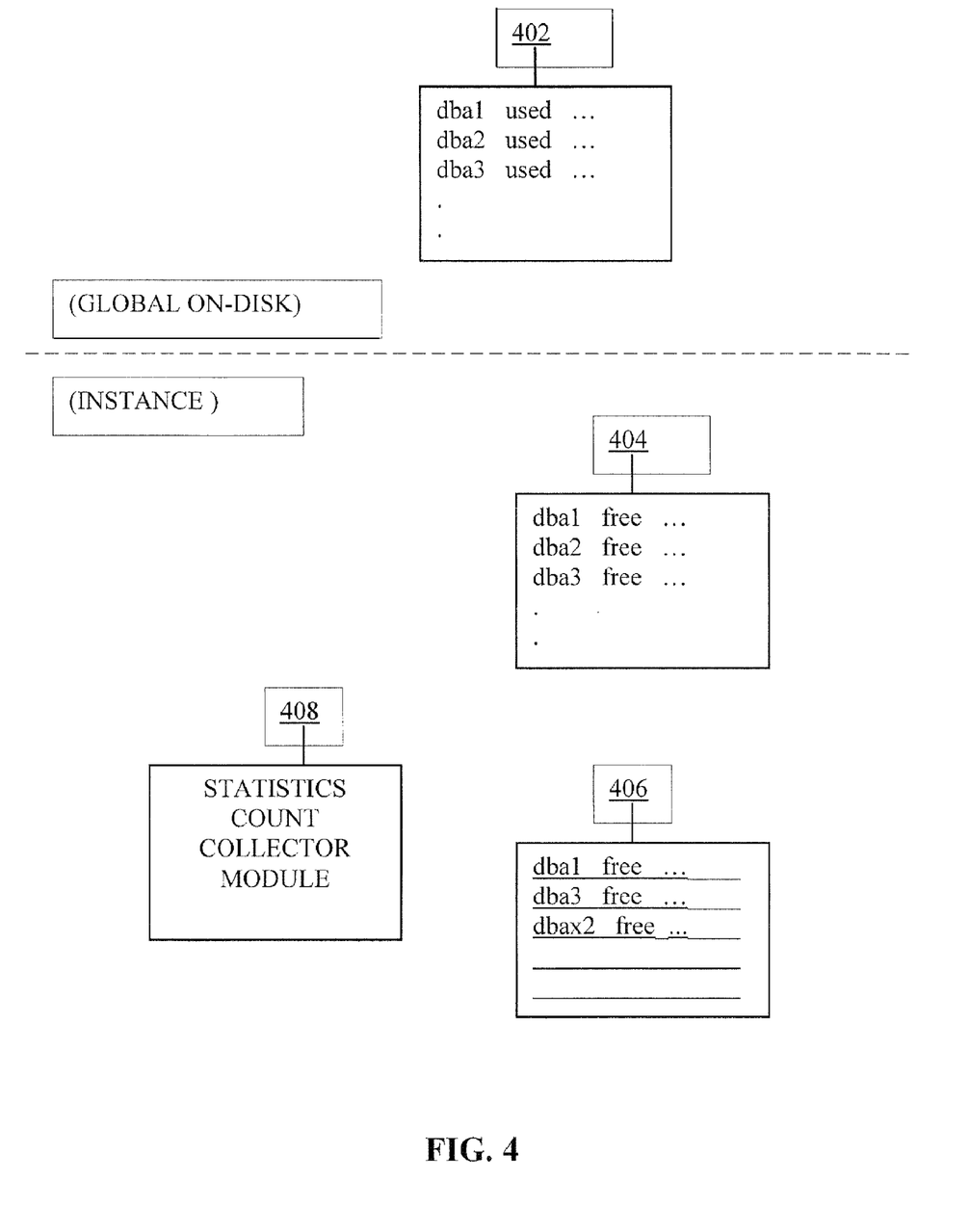
FIG. 4 is a schematic diagram of an embodiment showing the state of the metadata structures after the process of FIG. 3 is complete.

The state of the metadata structures after the process described hereinabove can be described with reference to FIG. 4. The instance marked the entries in the shared-block-usage map 402 as used. The instance populated the PA structure 404 with the entries and marked them as free. The instance makes a copy of PA structure 404 in local memory 406. The local memory is partitioned per the number of processors that were used based on the information provided by the statistics count collector 408 of the instance.

A Detailed In-Memory Structure

Figure 5:
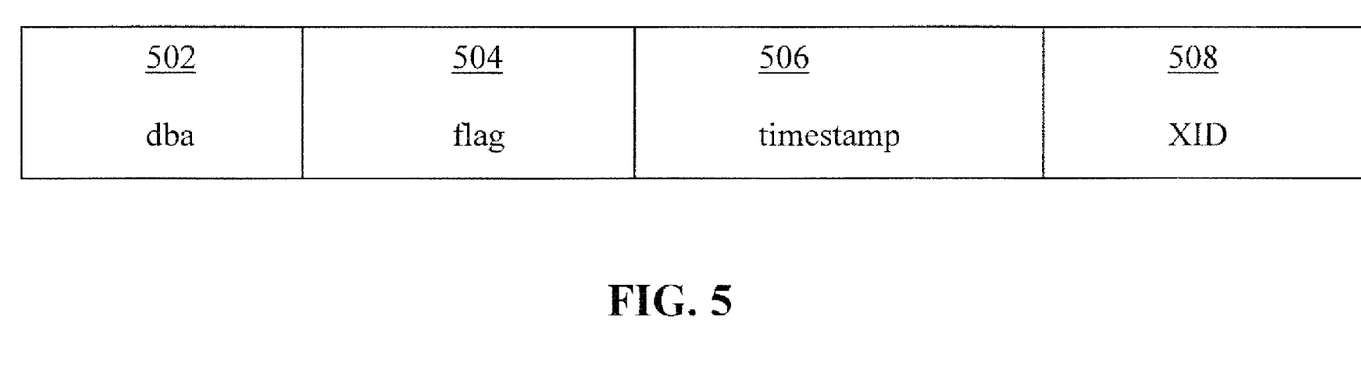
FIG. 5 is a schematic diagram of an embodiment of the in-memory structure.

An embodiment of the in-memory structure can be described with reference to FIG. 5. The in-memory structure contains a list of entries. Each entry in the list corresponds to a data block, and includes: the address of the data block 502 (referred to herein as "dba" for data block address), a flag 504, a timestamp 506, and a transaction identifier 508 ("transaction id" or "XID"). The flag 504 indicates whether the block is "free" or "used". The timestamp 506 indicates the time at which the corresponding data block was allocated to a transaction. The transaction identifier 508 identifies the transaction to which the data block was allocated. As shall be described in greater detail, the transaction identifiers are used to determine the actual status of data blocks after the in-memory structure has been synced to disk. For a "free" data block, the timestamp 506 and transaction identifier 508 fields are not applicable.

If a transaction process tries to take a latch on a partition whose latch is already taken, the process will not wait. Instead, the process moves on to the next partition. After obtaining a lock on a partition, the process then finds a block that is free. That is, the process finds an entry that has a flag that is set to free. The process marks the flag as used, updates the timestamp with the current time, adds the transaction id data to the XID field, and releases the latch.

Latch Recovery Process

If the transaction process dies while updating the entry in the in-memory structure, a latch recovery process begins. The latch recovery process detects that the transaction process has died. The latch recovery process marks the flag of the particular in-memory entry as free, because the corresponding block is not properly filled with data. The correctness at the transaction level is ensured.

Sync to Disk

In the event that an in-memory structure is filled (i.e. all the data blocks identified in the in-memory structure are marked as "used"), then a sync process is invoked. An embodiment of the sync process is described hereafter with reference to FIG. 6, a schematic diagram showing a full in-memory structure 602 that will be used to update the corresponding PA structure 604.

Figure 6:
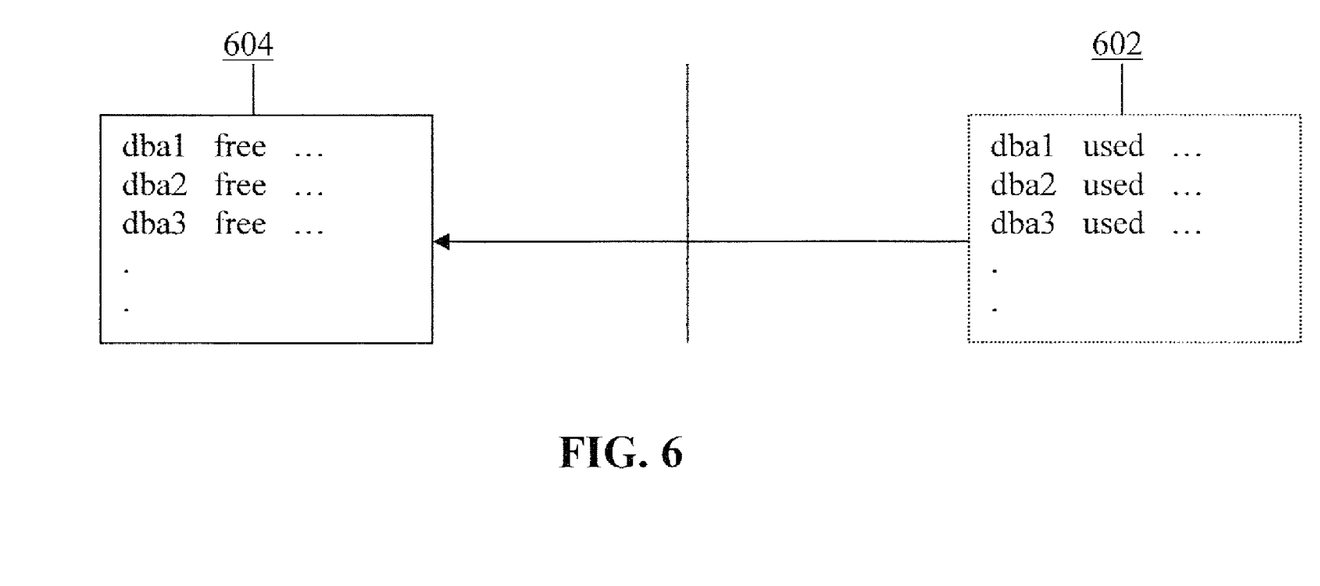
FIG. 6 is a schematic diagram of an embodiment showing a full in-memory structure that is used to update the instance's persistent area.

The instance takes a lock on PA structure 604. The contents of in-memory structure 602 are either flushed to disk, or an in-memory copy of PA structure 604 is updated to indicate that all blocks are identified in the PA structure 604 are used. However, unlike the updates to the in-memory structure 602, the update to the cached copy of PA structure 604 causes generation of redo, to ensure that the changes will be reflected in persistent memory in case of a failure. A single redo record covers all changes made to the PA structure 604. After the in-memory structure 602 is synced to disk, the lock on PA structure is released. The in-memory structures are synced disk by issuing a single I/O request. Once synced to disk, the in-memory structure 602 may be deallocated.

Recovery After Sync

In an embodiment, the in-memory data can be synced to the PA structure regardless of whether the transactions to which space was allocated have been committed. After the sync operation, a failure may occur that requires recovery of the PA structure. During recovery of a post-sync PA structure, for each transaction, the transaction id is used to look up the actual transaction to determine its state. Its state can be active, committed, or rolled back. If the state of a transaction is active, then the flag the PA structure is set to "fuzzy" to depict that the transaction is active. If the transaction was committed, then the flag is set to "used". If the transaction was rolled back the flag is set to "free". Table B hereinbelow shows the relationship of the state of the transaction with the flag in the data structure,

TABLE B

| TRANSCATION STATE | FLAG |
|---|---|
| ACTIVE | FUZZY |
| COMMITTED | USED |
| ROLLED BACK | FREE |

Pre-Sync Recovery of PA Structure

Suppose the instance crashes before an in-memory structure has been synced to disk. The in-memory structure, and the data contained therein, vanishes. After the crash, each PA structure that was not synced prior to the crash will typically indicate that all blocks identified therein are still "free", even though the instance may have allocated many of the blocks before the crash. Specifically, before the crash the disk blocks identified in the PA structure may have been (1) allocated to a transaction that committed before the crash, (2) allocated to a transaction that was not committed before the crash, or (3) not yet allocated to any transaction. Thus, the correct states of the entries in the PA structure need to be determined. The states can be used, free, or fuzzy. According to one embodiment, the state of entries is determined based on load-timestamps and allocation timestamps, as shall be described hereafter.

According to one embodiment, when the PA structure is loaded with entries representing data blocks, the time of the load is stored. The data that indicates the time that a PA structure is loaded with entries is referred to herein as the "load-timestamp". In one embodiment, a separate load-timestamp is maintained for each PA structure. However, in an embodiment that loads many PA structures at the same time, a load-timestamp may apply to a group of PA structures.

An allocation timestamp is a timestamp that indicates when a block was allocated for use. In one embodiment, when a block is allocated for use, the database server stores an allocation timestamp in the block itself.

At the time a PA structure is loaded, (1) all entries in the PA structure are for "free" blocks, and (2) the load-timestamp will be more recent than the allocation timestamp of all blocks identified in the PA structure. Subsequently, if a block identified in a PA structure is allocated by the instance associated with the PA structure, then the allocation timestamp of the block will be updated so that the allocation timestamp will be more recent than the load-timestamp of the PA block. Therefore, by comparing the load-timestamp of a PA structure with the allocation timestamp of a block identified in the PA structure, it is possible to tell whether the block was allocated for use by the instance associated with the PA structure. Specifically, if the allocation timestamp is older than the load-timestamp, then the corresponding block was not allocated by the instance. On the other hand, if the allocation timestamp is newer than the load-timestamp, then the corresponding block was allocated by the instance.

The mechanism for recovering the PA structure based on the load-timestamp is as follows. Each entry in the PA structure maps to a data block. The address of each data block is stored within the PA structure. The addresses in the PA block are used to locate and read the corresponding data blocks. Each data block maintains an interesting transaction list (ITL). ITL lists the transaction ids of all transactions that (a) have touched the data block and (b) have not yet committed. In one embodiment, only one transaction id is listed each data block. That is, at any given time, only one active transaction can be acting on the data block.

If allocation time stamp in the data block is greater than the load-timestamp of the PA structure, then the data block had been allocated for use before the instance crash. Under these circumstances, the transaction id of the data block is checked to determine the state of the transaction. If the state of the transaction is committed, then the flag in the corresponding entry in the PA structure is marked as used. If the state of the transaction is active, then the flag in the corresponding entry in the PA structure is marked as fuzzy. If the state of the transaction is rolled back, then the flag in the corresponding entry in the PA structure is marked as free.

On the other hand, if the allocation timestamp in the data block is less than (older than) the time stamp of the PA structure, then the "free" indication in the PA structure is correct, since the block was not allocated to any process after the PA structure was loaded.

Ongoing Loading PA Structure

Whenever an instance is loading the PA structure from a shared-block-usage map, the instance first scans through each entry in the shared-block-usage map to determine if the entry should be included in the PA structure. Entries in a shared-block-usage map for blocks that are "free" are included in the PA structure. Entries in the shared-block-usage map for blocks that are "used" or "fuzzy" are not added to the PA structure.

Deleting Data From Data Block

Suppose data is deleted from a data block was had been previously marked as used because data had been previously loaded. An operation associated with delete command marks the flag from used to free. The free operation allows for an entry representing the now free data block to be added to the shared-block-usage map, thus completing the cycle. That is, freeing up disk space results in the entries representing the free disk space to appear back on the shared-block-usage map.

Exemplary Operations

Figure 7:
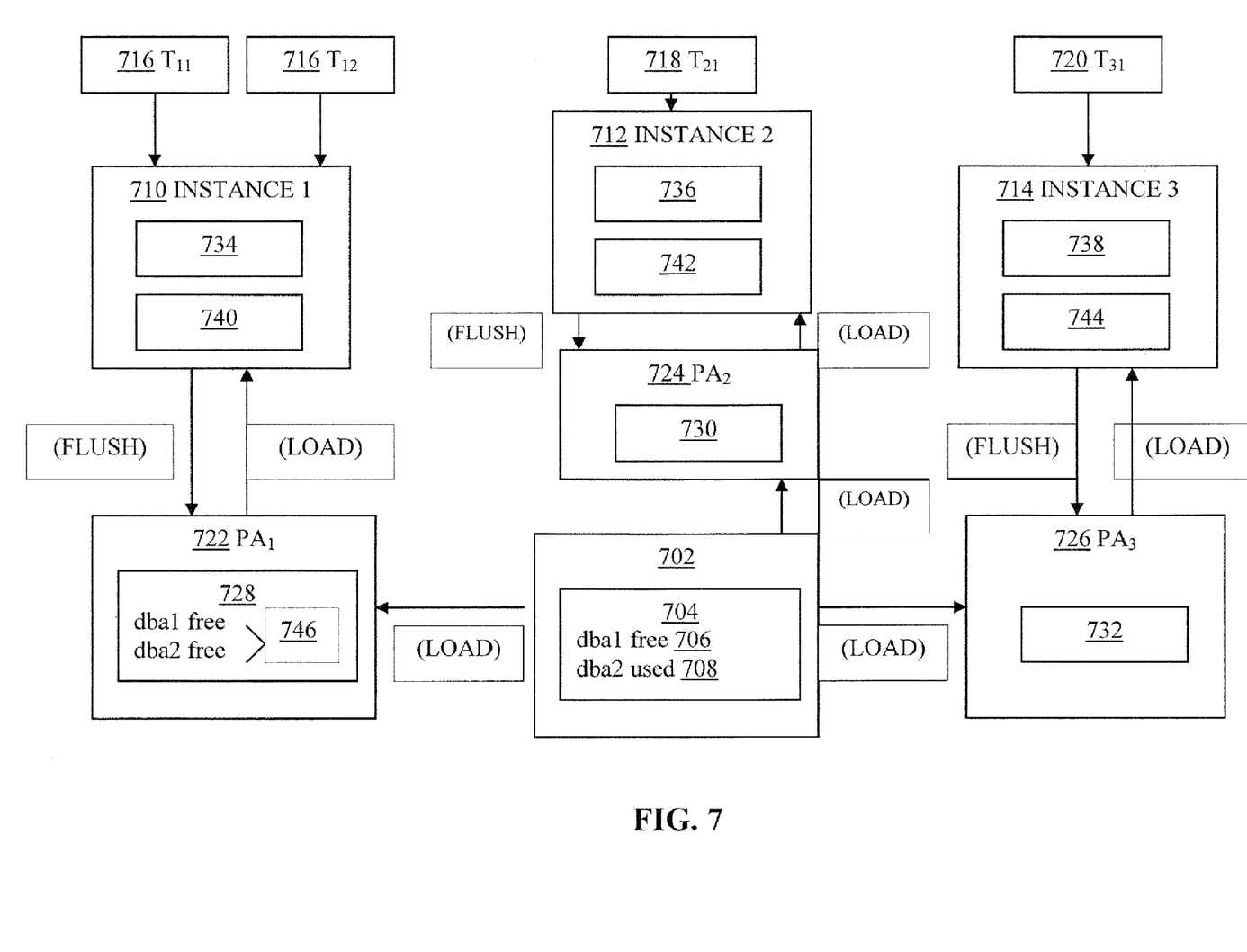
FIG. 7 is a schematic diagram of an embodiment showing three instances each containing an in-memory dispenser, a persistent area for each instance, each persistent area containing a per-instance block usage map, a shared-block-usage map, and their interactions.

An embodiment showing the main components and their interactions can be described with reference to FIG. 7. An on-disk entity 702 contains a shared-block-usage map 704 for a particular data base object. In an embodiment, the on-disk entity contains one or more shared-block-usage maps in 8 k blocks. Shared-block-usage map 704 contains information about whether data blocks are used or free. For example, shared-block-usage map 704 shows the block with data block address, dba1, is free 706. Shared-block-usage map 704 shows the block with data block address, dba2, is used 708. Three instances, instance 1 710, instance 2 712, and instance 3 714, are executing transactions. Instance 1 710 executes transactions T11 and T12 716, instance 2 712 executes transaction T21 718, and instance 3 714 executes transaction T31 720.

Each instance contains PA structures on-disk, some of which may have also been loaded in to their respective buffer caches. Instance 1 has PA structure PA1 722, instance 2 712 has PA structure PA2 724, and instance 3 714 has PA structure PA3 726. Each PA structure contains a per-instance block usage map. PA structure 1 722 contains block usage map 728, PA structure 2 724 contains block usage map 730, and PA structure 3 726 contains block usage map 732.

Each instance also contains an in-memory structure, whish initially a copy of each PA structure. The in-memory structure is also referred to herein as the in-memory dispenser. The in-memory dispensers are each partitioned based on the number of processors used by the instance in the last interval or by some other measurement, such as, for example, by the average of ten minute intervals in the last hour. Instance 1 710 contains in-memory dispenser 734, instance 2 712 contains in-memory dispenser 736, and instance 3 714 contains in-memory dispenser 738. Each instance also has a per-instance statistics count collector, which counts the number of requests for blocks or space in a given interval. In an embodiment, the statistics counts collector counts the number of requests for blocks in every 10 minutes interval and stores the data for the past hour in the 10 minute intervals. Instance 1 710 has statistics count collector 740, instance 2 712 has statistics count collector 742, and instance 3 714 has statistics count collector 744.

In an embodiment, based on the counts collected by statistics count collector 740, instance 1 710 requests a number of blocks for the next interval. For example, instance 1 requests 12 blocks for the next 10 minutes. Such request for blocks should provide enough space or blocks for transactions T11 and T12 716. The request for the 12 blocks causes certain blocks in shared-block-usage map 704 to be flagged as used, and generated redo for the change. For example, the flags of dba1 706 and dba2 708 are changed to "used." Copies of the entries 706 and 708 are loaded into PA1 722. In PA1 722, the flags of dba1 and dba2 are set to "free" 746. Similarly, copies of the entries in PA1 746 are loaded into in-memory dispenser 734 as is.

Continuing with the example, transactions T11 and T12 716 executing in instance 1 710 are hashed to a partition of in-memory dispenser 734. Each of transactions requests a latch on its respective partition. When each transaction has obtained the space it needs by marking blocks within the partition as "used", each latch is released.

When all entries in the in-memory dispenser are marked as used or fuzzy, due to transactions received by instance 1 716 during the time interval, a flush operation is invoked. That is, the entries in in-memory dispenser 734 are flushed to disk, i.e. PA1 722, resulting in the respective entries in PA1 722 having flags changed. A single redo record is generated to cover all changes that are synced to disk. After in-memory dispenser 734 is flushed to disk, in-memory dispenser 734 is de-allocated and ready for re-use.

If in-memory dispenser 734 is not all used and the instance crashes, then the pre-sync PA structure recovery process, described hereinabove, is invoked. Under these circumstances, each entry in PA1 722 will initially indicate that the corresponding block is free. The PA structure recovery process uses the transaction id of each entry to check the status or state of the transaction, based on the allocation timestamp of each block compared with the load-timestamp of when the PA structure was loaded. If the allocation timestamp of the block is after the load-timestamp of the PA structure, then the data block had been allocated prior to the crash, and the corresponding entry in the PA structure is marked as "used" or "fuzzy" based on whether the transaction to which the block was allocated had committed.

According to one embodiment, the PA structure is maintained as follows. Whenever a load operation or sync operation is performed, entries that are marked as used are deleted from the PA structure, otherwise, they remain in PA structure until they are marked as used and the check (i.e. during a load or sync operation) is performed. That is, every time a sync or load operation is performed, transactions are checked to determine whether their status is rolled back, committed, or active. Then, the flags are marked as free, used, and fuzzy, respectively. For example, suppose a request for space is made by a new transaction, and there is not enough space in the in-memory dispenser. A load operation is invoked. However, the entries in the PA structure are checked first to determine how much space is available. If there are enough entries in the PA structure that are free and that, collectively, provide enough disk space or blocks for the transaction, then a load from the shared-block-usage map is not necessary.

Hardware Overview

Figure 8:
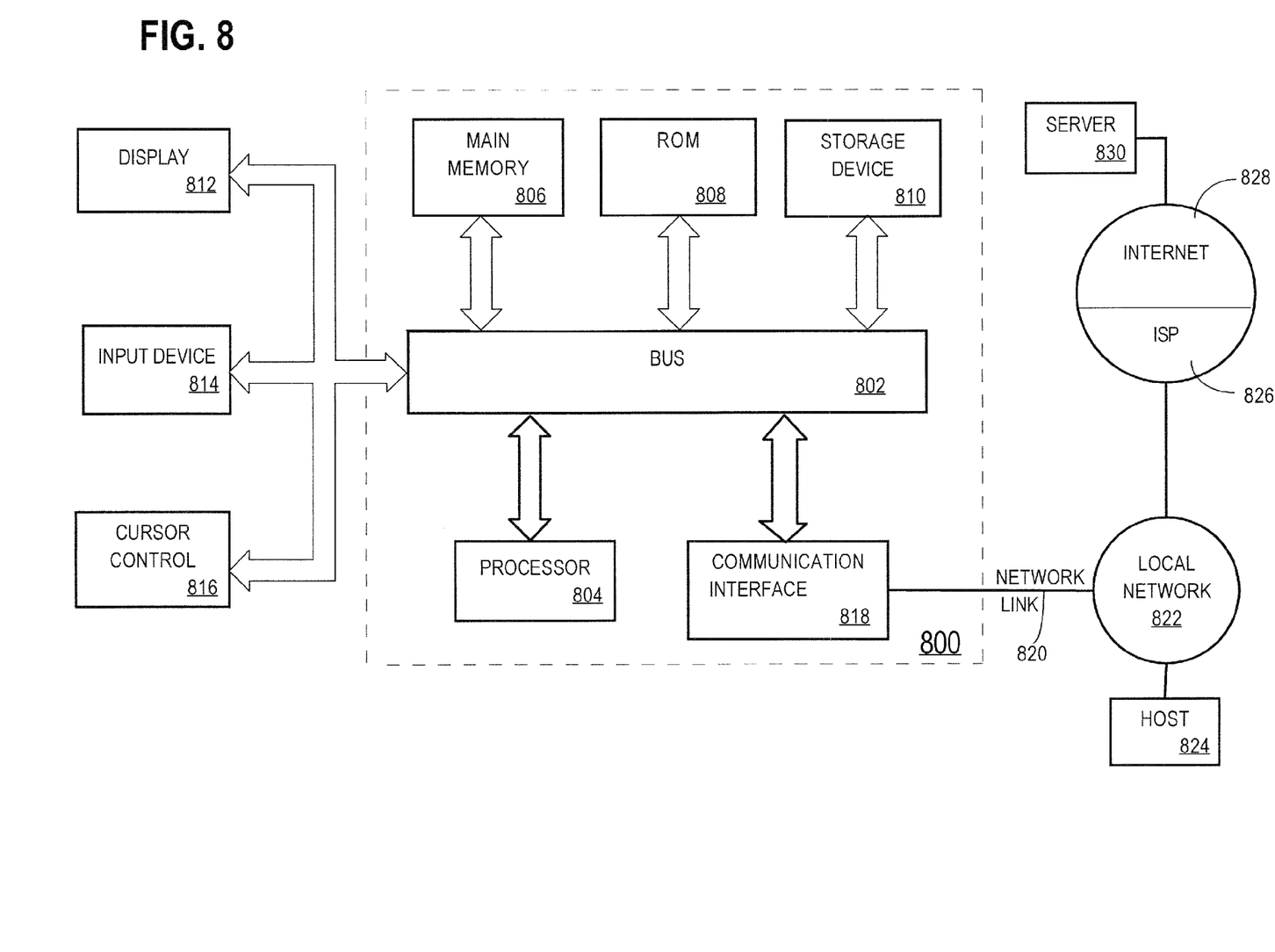
FIG. 8 is a block diagram that illustrates a computer system upon which an embodiment may be implemented.

FIG. 8 is a block diagram that illustrates a computer system 800 upon which an embodiment of the invention may be implemented. Computer system 800 includes a bus 802 or other communication mechanism for communicating information, and a processor 804 coupled with bus 802 for processing information. Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

The invention is related to the use of computer system 800 for implementing the techniques described herein. According to one embodiment of the invention, those techniques are performed by computer system 800 in response to processor 804 executing one or more sequences of one or more instructions contained in main memory 806. Such instructions may be read into main memory 806 from another computer-readable medium, such as storage device 810. Execution of the sequences of instructions contained in main memory 806 causes processor 804 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 804 for execution. Such a medium may take many forms, including but not limited to, non-volatile media, volatile media, and transmission media. Non-volatile media includes, for example, optical or magnetic disks, such as storage device 810. Volatile media includes dynamic memory, such as main memory 806. Transmission media includes coaxial cables, copper wire and fiber optics, including the wires that comprise bus 802. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are exemplary forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as the code is received, and/or stored in storage device 810, or other non-volatile storage for later execution. In this manner, computer system 800 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for managing space within a system, the method comprising:
for each instance of a plurality of instances that belong to the system, performing the steps of
generating an estimate of how much space will be required by the instance during a period of time;
performing a first update to first metadata that is shared among the plurality of instances, wherein the first update allocates to the instance an amount of space that is based on the estimate;
generating redo for said first update;
storing second metadata that is accessed only by the instance, wherein the second metadata initially indicates that said amount of space is free; and
within the instance, allocating space for processes executing within the instance from said amount of space.

2. The method of claim 1 wherein allocating space for processes executing within the instance from said amount of space includes:
creating, within the volatile memory of the instance, an in-memory structure that initially indicates that said amount of space is free; and
in response to allocating a portion of the amount of space to a process executing in said instance, performing a second update to said in-memory structure to indicate that said portion is used, wherein no redo is generated during said second update.

3. The method of claim 2 wherein:
the second metadata is stored on a disk block; and
the method further includes
partitioning the in-memory structure into partitions that are smaller than said disk block; and
managing access to each partition of the in-memory structure with latches, wherein each partition has a distinct latch.

4. The method of claim 3 wherein the step of partitioning the in-memory structure into partitions includes determining how many partitions to create based on a measure of concurrency within the instance.

5. A computer-readable storage medium storing one or more sequences of instructions which, when executed by one or more processors, causes the one or more processors to perform the method recited in claim 4.

6. A computer-readable storage medium storing one or more sequences of instructions which, when executed by one or more processors, causes the one or more processors to perform the method recited in claim 3.

7. The method of claim 2 further comprising:
performing a sync operation to cause a plurality of space allocation changes made to data in said in-memory structure to be reflected in said second metadata; and
as part of performing said sync operation, generating a single redo record to cover all of said plurality of plurality of space allocation changes.

8. The method of claim 7 wherein the sync operation is initiated in response to determining that all space represented in said in-memory structure has been allocated.

9. A computer-readable storage medium storing one or more sequences of instructions which, when executed by one or more processors, causes the one or more processors to perform the method recited in claim 8.

10. A computer-readable storage medium storing one or more sequences of instructions which, when executed by one or more processors, causes the one or more processors to perform the method recited in claim 7.

11. A computer-readable storage medium storing one or more sequences of instructions which, when executed by one or more processors, causes the one or more processors to perform the method recited in claim 2.

12. The method of claim 1 wherein the step of generating an estimate of how much space will be required by the instance during a period of time includes:
determining and storing a first amount of space actually requested by processes executing in said instance during a time interval, and
generating said estimate based, at least in part, on the first amount of space.

13. A computer-readable medium storing one or more sequences of instructions which, when executed by one or more processors, causes the one or more processors to perform the method recited in claim 12.

14. The method of claim 1 wherein the step of storing second metadata that is accessed only by the instance includes loading addresses of free blocks into a local PA structure associated with said instance.

15. A computer-readable storage medium storing one or more sequences of instructions which, when executed by one or more processors, causes the one or more processors to perform the method recited in claim 14.

16. The method of claim 1, wherein the step of performing a first update to first metadata that is shared among the plurality of instances includes obtaining an exclusive lock on a shared-block-usage map that indicates usage status of blocks of a storage that is shared by the plurality of instances.

17. A computer-readable storage medium storing one or more sequences of instructions which, when executed by one or more processors, causes the one or more processors to perform the method recited in claim 16.

18. The method of claim 1, wherein:
the plurality of instances are a plurality of database server instances that share access to a storage device; and
the first metadata indicates usage status of blocks of said storage device.

19. A computer-readable storage medium storing one or more sequences of instructions which, when executed by one or more processors, causes the one or more processors to perform the method recited in claim 18.

20. The method of claim 1 further comprising recovering said second metadata in response to a failure that occurs before the said in-memory structure is synced to said second metadata, wherein recovering includes:
determining an allocation timestamp associated with a data block that is currently marked free in said second metadata;
determining a load-timestamp associated with said second data;
performing a comparison between said allocation timestamp and said load-timestamp; and
determining whether the data block should continued to be marked as free, within said second metadata, based at least in part on said comparison.

21. The method of claim 20 further comprising recovering said second metadata in response to a failure that occurs after the in-memory structure is synced with said second metadata, wherein recovering includes:
identifying a block that is marked, within said second metadata, as used;
determining, from data stored in said second metadata, a transaction to which said block was allocated prior to said failure; and
determining a status of said block based on a status of said transaction.

22. The method of claim 21 wherein determining a status of said block based on a status of said transaction includes marking said block as used, within said second metadata, in response to determining that said transaction has committed.

23. A computer-readable storage medium storing one or more sequences of instructions which, when executed by one or more processors, causes the one or more processors to perform the method recited in claim 22.

24. The method of claim 21 wherein determining a status of said block based on a status of said transaction includes marking said block as fuzzy, within said second metadata, in response to determining that said transaction is active.

25. A computer-readable storage medium storing one or more sequences of instructions which, when executed by one or more processors, causes the one or more processors to perform the method recited in claim 24.

26. A computer-readable storage medium storing one or more sequences of instructions which, when executed by one or more processors, causes the one or more processors to perform the method recited in claim 21.

27. A computer-readable storage medium storing one or more sequences of instructions which, when executed by one or more processors, causes the one or more processors to perform the method recited in claim 20.

28. A computer-readable storage medium storing one or more sequences of instructions which, when executed by one or more processors, causes the one or more processors to perform the method recited in claim 1.

29. A method for managing space within a system, the method comprising:
for each instance of a plurality of instances that belong to the system, performing the steps of
performing a first update to first metadata that is shared among the plurality of instances, wherein the first update allocates to the instance an amount of space requested by that instance;

generating redo for said first update;

storing second metadata that is accessed only by the instance, wherein the second metadata initially indicates that said amount of space is free;

creating, within the volatile memory of the instance, an in-memory structure that initially indicates that said amount of space is free; and in response to allocating a portion of the amount of space to a process executing in said instance, performing a second update to said in-memory structure to indicate that said portion is used, wherein no redo is generated during said second update.

30. The method of claim 29 wherein:

the second metadata is stored on a disk block; and the method further includes partitioning the in-memory structure into partitions that are smaller than said disk block; and managing access to each partition of the in-memory structure with latches, wherein each partition has a distinct latch.

31. A computer-readable storage medium storing one or more sequences of instructions which, when executed by one or more processors, causes the one or more processors to perform the method recited in claim 30.

32. The method of claim 29 further comprising:

performing a sync operation to cause a plurality of space allocation changes made to data in said in-memory structure to be reflected in said second metadata; and as part of performing said sync operation, generating a single redo record to cover all of said plurality of plurality of space allocation changes.

33. A computer-readable storage medium storing one or more sequences of instructions which, when executed by one or more processors, causes the one or more processors to perform the method recited in claim 32.

34. The method of claim 29 further comprising recovering said second metadata in response to a failure that occurs before the said in-memory structure is synced to said second metadata, wherein recovering includes:

determining an allocation timestamp associated with a data block that is currently marked free in said second metadata;

determining a load-timestamp associated with said second data;

performing a comparison between said allocation timestamp and said load-timestamp; and determining whether the data block should continued to be marked as free, within said second metadata, based at least in part on said comparison.

35. A computer-readable storage medium storing one or more sequences of instructions which, when executed by one or more processors, causes the one or more processors to perform the method recited in claim 34.

36. The method of claim 29 further comprising recovering said second metadata in response to a failure that occurs after the in-memory structure is synced with said second metadata, wherein recovering includes:

identifying a block that is marked, within said second metadata, as used;

determining, from data stored in said second metadata, a transaction to which said block was allocated prior to said failure; and determining a status of said block based on a status of said transaction.

37. A computer-readable storage medium storing one or more sequences of instructions which, when executed by one or more processors, causes the one or more processors to perform the method recited in claim 36.

38. A computer-readable storage medium storing one or more sequences of instructions which, when executed by one or more processors, causes the one or more processors to perform the method recited in claim 29.

* * * * *

UNITED STATES PATENT AND TRADEMARK OFFICE
CERTIFICATE OF CORRECTION

PATENT NO. : 7,664,799 B2
APPLICATION NO. : 11/830568
DATED : February 16, 2010
INVENTOR(S) : Niloy Mukherjee et al.

It is certified that error appears in the above-identified patent and that said Letters Patent is hereby corrected as shown below:

In column 15, line 18, in claim 7, after "said" delete "plurality of".

In column 15, line 44, in claim 13, after "readable" insert -- storage --.

In column 17, line 30, in claim 32, after "said" delete "plurality of".

Signed and Sealed this

Fourteenth Day of September, 2010

David J. Kappos
*Director of the United States Patent and Trademark Office*